US012783366B2

(12) United States Patent
Venu et al.

(10) Patent No.: US 12,783,366 B2
(45) Date of Patent: Nov. 3, 2026

(54) INTEGRITY CHECKING

(71) Applicant: Arm Limited, Cambridge (GB)

(72) Inventors: Balaji Venu, Cambridge (GB); Mbou Eyole, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/877,109

(22) PCT Filed: Jun. 1, 2023

(86) PCT No.: PCT/GB2023/051451
§ 371 (c)(1),
(2) Date: Dec. 19, 2024

(87) PCT Pub. No.: WO2024/003522
PCT Pub. Date: Jan. 4, 2024

(65) Prior Publication Data
US 2025/0377989 A1 Dec. 11, 2025

(30) Foreign Application Priority Data
Jun. 28, 2022 (GB) ..................................... 2209458

(51) Int. Cl.
*G06F 11/16* (2006.01)
*G06F 11/22* (2006.01)

(52) U.S. Cl.
CPC ...... *G06F 11/1645* (2013.01); *G06F 11/2236* (2013.01)

(58) Field of Classification Search
CPC ......................... G06F 11/1645; G06F 11/2236
See application file for complete search history.

(56) References Cited

U.S. PATENT DOCUMENTS 11,042,143 B2 * 6/2021 Bannow ............. G05B 19/0428
11,408,747 B2 * 8/2022 Nara .................. G01C 21/3484
2008/0052494 A1 2/2008 Weiberle
(Continued)

OTHER PUBLICATIONS

Combined Search and Examination Report for an International Application No. GB2209458.5, dated Feb. 16, 2023.
(Continued)

*Primary Examiner* — Bryce P Bonzo
*Assistant Examiner* — Xinyuan Yu
(74) *Attorney, Agent, or Firm* — NIXON & VANDERHYE P.C.

(57) ABSTRACT

An apparatus has processing circuitry to execute instructions. The processing circuitry has calculation circuitry which is responsive to one or more instructions requiring a calculation to be performed to compute the result of the calculation and approximation circuitry which is responsive to said one or more instructions to calculate an approximate result of the calculation independently of the calculation circuitry. The processing circuitry also has integrity checking circuitry to perform an integrity check by comparing the result of the calculation performed by the calculation circuitry and the approximate result of the calculation performed by the approximation circuitry. The integrity checking circuitry detects an error in the processing circuitry if it is determined that a difference between the result of the calculation and the approximate result of the calculation is greater than a deviation threshold.

20 Claims, 5 Drawing Sheets

(56) References Cited

U.S. PATENT DOCUMENTS

| | | | | |
|---|---|---|---|---|
| 2012/0042153 | A1 * | 2/2012 | Morrison ............ | G06F 11/0721 |
| | | | | 712/E9.035 |
| 2019/0012242 | A1 * | 1/2019 | Özer ................... | G06F 11/1629 |

OTHER PUBLICATIONS

International Search Report and Written Opinion for an International Application No. PCT/GB2023/051451 dated Jul. 7, 2023.
Examination Report for an International Application No. GB2209458.5, dated Jul. 16, 2024.
Hochschild et al., "Cores that don't count."

* cited by examiner

```
Float pow (float x, float y)

pow:
    START_IC_<id>_<num_args>
    .
    .
    .
    END_IC_<id>
```

```
Void div (int. a, int. b, int. *quotient, int. *remainder){
    *quotient = a/b;
    *remainder = a % b;
}

div:
    START_IC_<id1>_<num_args>
    SDIV Rtemp, R0, R1;
    STR Rtemp, [#quotient];
    END_IC_<id1>

    START_IC_<id2>_<num_args>
    SREM Rtemp, R0, R1;
    STR Rtemp, [#remainder];
    END_IC_<id2>
```

INTEGRITY CHECKING

BACKGROUND

The present technique relates to the field of data processing. More particularly, the present technique relates to integrity checking.

A fault may occur in a processor that affects the operation of that processor. Such faults may be attributable to one or more of a number of possible factors such as manufacturing issues, ageing of the system, or bugs in hardware or software design for example. If not addressed, these faults may lead to errors in calculations performed by the processor. In some cases, such faults may occur only in a non-deterministic manner with the same calculation performed on the same processor or core leading to erroneous results in one instance but not in another. While some faults in processing circuitry lead to easily identifiable errors, some faults lead to valid but erroneous results being produced from calculations making detection of these faults more difficult. Cores exhibiting such behaviour may be termed “mercurial cores”.

“Cores that don’t count”, Peter H. Hochschild et al., 2021, Proc. 18th Workshop on Hot Topics in Operating Systems (HotOS 2021) describes some known instances of such mercurial cores that lead to intermittent faults.

SUMMARY

In one example arrangement there is provided an apparatus comprising: processing circuitry to execute instructions; wherein the processing circuitry comprises: calculation circuitry responsive to one or more instructions requiring a calculation to be performed to compute the result of the calculation; approximation circuitry responsive to said one or more instructions to calculate an approximate result of the calculation independently of the calculation circuitry; and integrity checking circuitry configured to perform an integrity check by: comparing the result of the calculation performed by the calculation circuitry and the approximate result of the calculation performed by the approximation circuity; and detecting an error in the processing circuitry in response to determining that a difference between the result of the calculation and the approximate result of the calculation is greater than a deviation threshold.

In another example arrangement, there is provided a method comprising: executing instructions by processing circuitry; computing, responsive to one or more instructions requiring a calculation to be performed, the result of the calculation; calculating, responsive to said one or more instructions, an approximate result of the calculation independently of the computing; and perform an integrity check by: comparing the result of the calculation and the approximate result of the calculation from; and detecting an error in the processing circuitry in response to determining that a difference between the result of the calculation and the approximate result of the calculation is greater than a deviation threshold.

In a yet further example arrangement, there is provided a computer program for controlling a host data processing apparatus to provide an instruction execution environment comprising: processing program logic to execute instructions; wherein the processing program logic comprises: calculation program logic responsive to one or more instructions requiring a calculation to be performed to compute the result of the calculation; approximation program logic responsive to said one or more instructions to calculate an approximate result of the calculation independently of the calculation program logic; and integrity checking program logic configured to perform an integrity check by: comparing the result of the calculation performed by the calculation program logic and the approximate result of the calculation performed by the approximation program logic; and detecting an error in the processing program logic in response to determining that a difference between the result of the calculation and the approximate result of the calculation is greater than a deviation threshold.

BRIEF DESCRIPTION OF THE DRAWINGS

Further aspects, features, and advantages of the present technique will be apparent from the following description of examples, which is to be read in conjunction with the accompanying drawings, in which.

DESCRIPTION OF EXAMPLES

Figure 1:
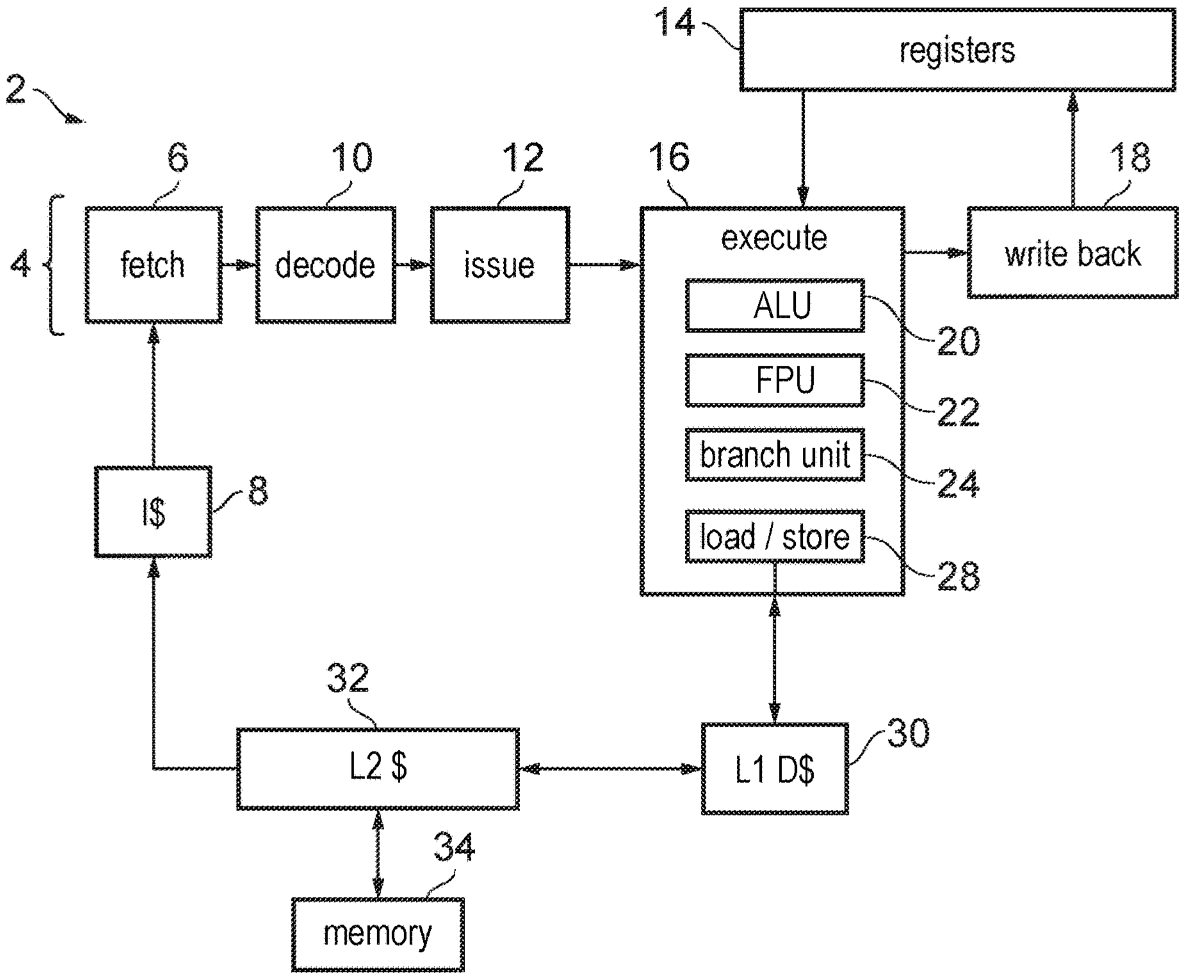
FIG. 1 schematically illustrates an example of a data processing apparatus.

Before discussing the examples with reference to the accompanying figures, the following description of examples is provided.

Intermittent faults in mercurial cores as mentioned above can lead to errors in calculations performed by processing circuitry in a number of possible ways. For example, the intermittent faults may lead to:

data encrypted on one mercurial core only being able to be decrypted by that core;

data becoming corrupted during copying;

violations of lock semantics; and calculation errors e.g., such that int(1.1^53) will return 0 whereas int(1.1^52) correctly returns 142.

The present techniques provide an apparatus for detecting intermittent faults, and in particular for detecting intermittent faults that lead to calculation errors. The detection of such faults can also be referred to as integrity checking.

One possible approach by which intermittent faults in processing circuitry could be detected involves redundant execution of an application, i.e., running code two or more times and comparing the results obtained. However, such an approach involves large overheads to perform and is particularly costly since each calculation has to be repeated.

Another possible approach to detecting faults is to provide duplicated computation logic, for example, by providing two cores operating in parallel (referred to as dual core lock step) performing the same workload with the outputs of the cores compared at each cycle. This approach is however expensive in terms of the area and power required since an entire additional core needs to be provided along with circuitry needed to compare the results of the two cores.

The inventors recognised that in many cases to check the integrity of a particular calculation, a precise value is not needed against which to compare the result obtained by calculation circuitry that has performed the calculation. Rather, it may be sufficient to calculate an approximate result of the calculation and compare the approximate result with the result obtained by the calculation circuitry. If a fault has led to an error in the calculation that has caused sufficient deviation in the result, the approximate result will differ from the obtained result sufficiently that it can be determined that an error has occurred or is likely to have occurred. On the other hand, even if the approximate result differs from the result obtained by the calculation circuitry, if the difference is a relatively small amount, this may indicate that the calculation was likely to have produced the correct result.

As such, duplicated computation logic such as a separate core does not need to be provided, with the apparatus instead having approximation circuitry able to obtain an approximate result using less power and/or area than would be required to independently calculate another precise result. The approximate result may also be calculated in parallel with the result obtained by the calculation circuitry thereby providing a more efficient process for integrity checking than could be achieved if the calculation were to be repeated one or more times using the same circuitry.

In accordance with the techniques described herein, there is therefore provided an apparatus comprising processing circuitry to execute instructions. The processing circuitry may comprise a central processing unit (CPU) or graphics processing unit (GPU) or parts thereof. In particular, the processing circuitry may comprise an arithmetic logic unit (ALU) or floating point unit (FPU) as may be found in a CPU or GPU. The processing circuitry has calculation circuitry that is responsive to one or more instructions that require a calculation to be carried out. For example, the calculation circuitry may be a logical unit of an ALU or FPU configured to perform a particular type of calculation. When the processing circuitry executes an instruction that requires that type of calculation to be carried out, the calculation circuitry performs the calculation to compute the result of the calculation.

However, faults in the calculation circuitry may lead to erroneous results of the calculation being produced. In some cases, the faults may not be obvious which could be the case if the calculation circuitry failed to produce a result entirely, but may instead lead to the calculation circuitry providing incorrect but otherwise valid results of the calculation. This fault may be intermittent in the sense that it causes the result of the calculation to be erroneous in some circumstances or at some times but under other circumstances or at other times, even where the conditions under which the calculation is performed are the same.

Therefore, to check the integrity of the calculation circuitry itself and determine whether the result of the calculation is likely to be accurate, approximation circuitry and integrity checking circuitry are provided. The approximation circuitry is arranged to independently calculate an approximate result of the calculation against which the result obtained by the calculation circuitry can be compared. This may be done concurrently with the calculation by the calculation circuitry to reduce the performance impact of performing this check.

Once the result of the calculation from the calculation circuitry and the approximate result from the approximation circuitry are available, the integrity checking circuitry performs the integrity check by comparing the result and the approximate result. Based on the difference between approximate result and the result of the calculation, the integrity checking circuitry may determine whether there is an error in the processing circuitry. This determination as to whether there is an error makes use of a deviation threshold indicative of an expected or tolerable difference between the approximate result and the result from the calculation circuitry. Since the approximate result is not calculated precisely, it is expected that even where the processing circuitry is functioning correctly, there will be some deviation between the approximate result and the result from the calculation circuitry. As such, the deviation threshold provides a way to determine whether this deviation is sufficient to determine that an error has been detected. Thus, while a small deviation between the calculated result from the calculation circuitry and the approximate result may be attributed to the impreciseness of the approximation, if the calculation circuitry produces a result that differs significantly from the expected result determined by the approximation, this may be indicative of a fault in the calculation circuitry (or indeed in the approximation circuitry).

In response to detecting the error, the integrity checking circuitry could be arranged to take a number of possible actions. For example, the integrity checking circuitry may indicate that the error has been detected by raising an exception or saving a particular value in a register indicate that the error was detected. This could be used to indicate to software that the error was detected and as such the result of the calculation may be erroneous or to aid in detecting mercurial cores prone to intermittent faults so that these cores can be replaced, for example. Additionally, or alternatively, the integrity checking circuitry may cause the calculation to be repeated.

In some examples, the integrity check may be initiated based on an integrity checking initiation instruction, thereby allowing the integrity check to be controlled using software. That is, the programmer or compiler may include in program code the integrity checking initiation instruction such that execution of the integrity checking initiation instruction by the processing circuitry causes the integrity check to be carried out.

This may be implemented using an integrity checking initiation instruction in combination with an integrity checking termination instruction. Where the integrity checking initiation instruction is followed by one or more instructions that cause the calculation circuitry to perform calculations, the execution of the integrity checking initiation instruction causes the approximation circuitry to calculate the approximate result for those calculations. The processing circuitry is then responsive to execution of an integrity checking termination instruction signalling the end of the sequence of instructions for which the integrity check is to be carried out such that the integrity checking circuitry is then invoked to perform the integrity check and compare the results obtained by the calculation circuitry and the approximation circuitry.

For the calculation circuitry, the location of the operands on which the calculation is based may be specified by the instruction to be executed. For example, a particular form of instruction may indicate a register in which an operand is stored or may indicate a register containing an address in memory from which the operand is to be obtained. It will be appreciated that the operand may be indicated in other manners, for example using offsets or encoded in the instruction itself.

The approximation circuitry may determine the location of the operands on which it is to operate from the same instructions as described above. However, in some examples, the integrity checking initiation instruction specifies one or more registers containing the operands on which the calculations represented by the subsequent instructions are to operate. In this case, the approximation circuitry is configured to obtain the one or more operands from the one or more specified registers. This approach allows the operands to be located in any of a number of registers that may be provided within the apparatus, thereby providing flexibility regarding where the operands may be stored before invoking the integrity checking mechanism.

In some examples, to avoid needing to specify the register in the integrity checking initiation instruction however, the one or more operands on which the approximation circuitry is to operate may be predetermined, for example by being defined as architectural behaviour. Thus, in response to the integrity checking initiation instruction, the approximation circuitry may obtain the operands from the predetermined registers.

In some cases, the approximation circuitry may only be suitable for approximating the result of certain types of calculation that are supported by the calculation circuitry. For other types of calculation that are supported by the calculation circuitry, due to the nature of the calculation and/or the configuration of the approximation circuitry, the approximation circuitry may not be able to determine an approximate result, or may not be able to determine the approximate result with sufficient accuracy to enable the integrity check to be carried out making use of the approximation circuitry.

In this case, the approximation circuitry may be additionally provided with approximation suitability checking circuitry to determine whether a particular calculation is suitable for approximation by the approximation circuitry. Based on determining whether a particular calculation is suitable or is not suitable for approximation, the approximation suitability checking circuitry is configured to allow or prevent respectively the integrity check to be performed in respect of the particular calculation.

The approximation suitability checking circuitry may be configured to determine whether a particular is suitable for approximation on the basis of a number of possible factors. In some examples, the approximation suitability checking circuitry makes use of more than one different mechanism to determine whether a calculation is suitable for approximating.

One such approach involves determining that a particular calculation is suitable for approximation based on determining that the calculation involves evaluating a function that is mathematically smooth at a point at which the function is to be evaluated. The function being mathematically smooth at the point means that the function can differentiated and the derivative evaluated at that point. For example, where the calculation involves raising one operand to the power of another operand, the function being evaluated will be smooth and the function can be differentiated.

In determining whether a particular calculation is suitable for approximation, the approximation suitability checking circuitry may also take into account the behaviour of the derivative of the function being evaluated such that only calculations involving evaluating functions have a derivate that does not change too quickly are found to be suitable for approximation.

In some cases the function being evaluated will correspond directly to an instruction that is executed (e.g., where the function comprises addition, an addition instruction may be provided); however, in some cases the function will correspond to several instructions (e.g., if the Instruction Set Architecture does not provide a multiplication instruction, the function may correspond to one or more addition and branch instructions).

This condition for suitability for approximation may for example be used where the approximation circuitry relies on the derivate of the function to determine the approximate result.

In some examples, the approximation suitability checking circuitry is configured to determine whether a particular calculation is suitable for approximation by the approximation circuitry using at least one of a neural network, a random forest, and a decision tree. These structures may be trained to recognise functions for which the approximation circuitry will be able to reliably produce an approximate result. These structures may be trained based on the observed results of the calculation circuitry and/or the approximation circuitry for various functions that are evaluated using the apparatus or these structures may be pretrained before being deployed in the apparatus such that the apparatus is provided with an already trained model to be used by the neural network, random forest, or decision tree.

Another approach to identifying whether a calculation is suitable for approximation by the approximation circuitry involves identifying the calculation as suitable for approximation based on determining that the calculation corresponds to an operation from a predetermined list of operations. For example, the approximation suitability checking circuitry may be provided with an indication of certain operations (which may correspond to particular instructions or sequences of instructions) that are known to be suitable for approximation using the approximation circuitry. Where the calculation corresponds to such an operation, the approximation suitability checking circuitry may therefore determine that the calculation is suitable for approximation.

The approximation circuitry itself could make use of various techniques for calculating approximate results. For example, a neural network may be used to determine the approximate results. In some examples however, the approximation circuitry maintains and makes use of calculation result history information based on previous calculations that have been computed by the calculation circuitry. In this way, the approximation circuitry can make use of the results from the calculation circuitry and base the calculation of an approximate result on these previous results. In such cases, the approximation circuitry references the calculation result history information to calculate the approximate result of a calculation.

The calculation result history information may include an indication of previous results as computed by the calculation circuitry as well as gradient information indicative of how an operation to be evaluated to carry out the calculation varies in dependence on the inputs to the operation. The operation could be a mathematical function or may involve more than one sub operation such that the operation requires one or more functions to be evaluated as part of the calculation. As such, the gradient information may reflect the dependence of the operation as whole, including the functions that form sub-operations of the operation, on the inputs to the operation.

To calculate an approximate result for a particular calculation, the approximation circuitry may be configured to use a corresponding previous result and gradient information to estimate the result of the calculation with the inputs that are to be used. For example, the approximation may select a previous result obtained using inputs that are similar to the inputs for the calculation to be approximated and then identify a gradient indicative of how the result of the calculation will vary as the inputs are varied. This can then be used to derive an approximate result for the calculation.

This provides a quick and efficient way of determining an approximate value for the result of the calculation which can be compared with the result provided by the calculation circuitry. If the result from the calculation circuitry and the approximate result differ by more than the deviation threshold, this may be taken as an indication that an error has occurred which may be the result of a fault in the processing circuitry.

The calculation result history information may be populated by the approximation circuitry based on observed results from the calculation circuitry. Specifically, the approximation circuitry may be responsive to the calculation circuitry computing the result of a given calculation to update the calculation result history based on the result of the given calculation as calculated by the calculation circuitry. For example, the approximation circuitry may store the result of the given calculation and the inputs which led to that result. Based on the result and other results previously obtained for that calculation, the approximation circuitry may also calculate and store new gradient information to be used in calculating approximate results.

In some examples, the calculation result history information is updated each time a calculation is performed using the calculation circuitry; however, in some examples this update may only be performed for calculations for which an integrity check is carried out.

The deviation threshold may be obtained in several possible ways. For example, the deviation threshold may be set in a system register such that the integrity checking circuitry is able to obtain the deviation threshold from the system register. Thus, the deviation threshold to be used can be modified by altering the value stored in the register.

In some examples, the approximation circuitry, as well as determining the approximate result, also determines a level of confidence associated with that approximation. Where the calculation result history was used to make the approximation, this level of confidence could be determined for example based on the difference between the input or inputs for which there was an entry in the calculation result history and the input or inputs on which the calculation was based. Irrespective of how the level of confidence was established, this level of confidence may be used to determine the deviation threshold to use such that where the level of confidence is higher, the deviation threshold is smaller.

Where the integrity checking initiation instruction and the integrity checking termination instruction are used to control the integrity checking process, at least one of the integrity checking initiation instruction and the integrity checking termination instruction may specify a particular deviation threshold with the processing circuitry responsive to execution of this instruction to cause the integrity checking circuitry to use that particular deviation threshold.

Particular examples will now be described with reference to the figures.

FIG. 1 schematically illustrates an example of a data processing apparatus 2 in which the techniques described herein may be applied. The apparatus 2 has processing circuitry 4 in the form of a processing pipeline 4 which includes a number of pipeline stages. In this example, the pipeline stages include a fetch stage 6 for fetching instructions from an instruction cache 8; a decode stage 10 for decoding the fetch program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example, in an out-of-order processor an additional register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include an arithmetic/logic unit (ALU) 20 for performing arithmetic or logical operations; a floating point unit (FPU) 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34. In this example the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

The apparatus 2 may have one or more faults, arising for example due to issues in manufacturing or ageing of the system. In particular, the processor could have one or more intermittent faults that only occur from time to time and which lead to errors in calculations performed by the apparatus 2.

Figure 2:
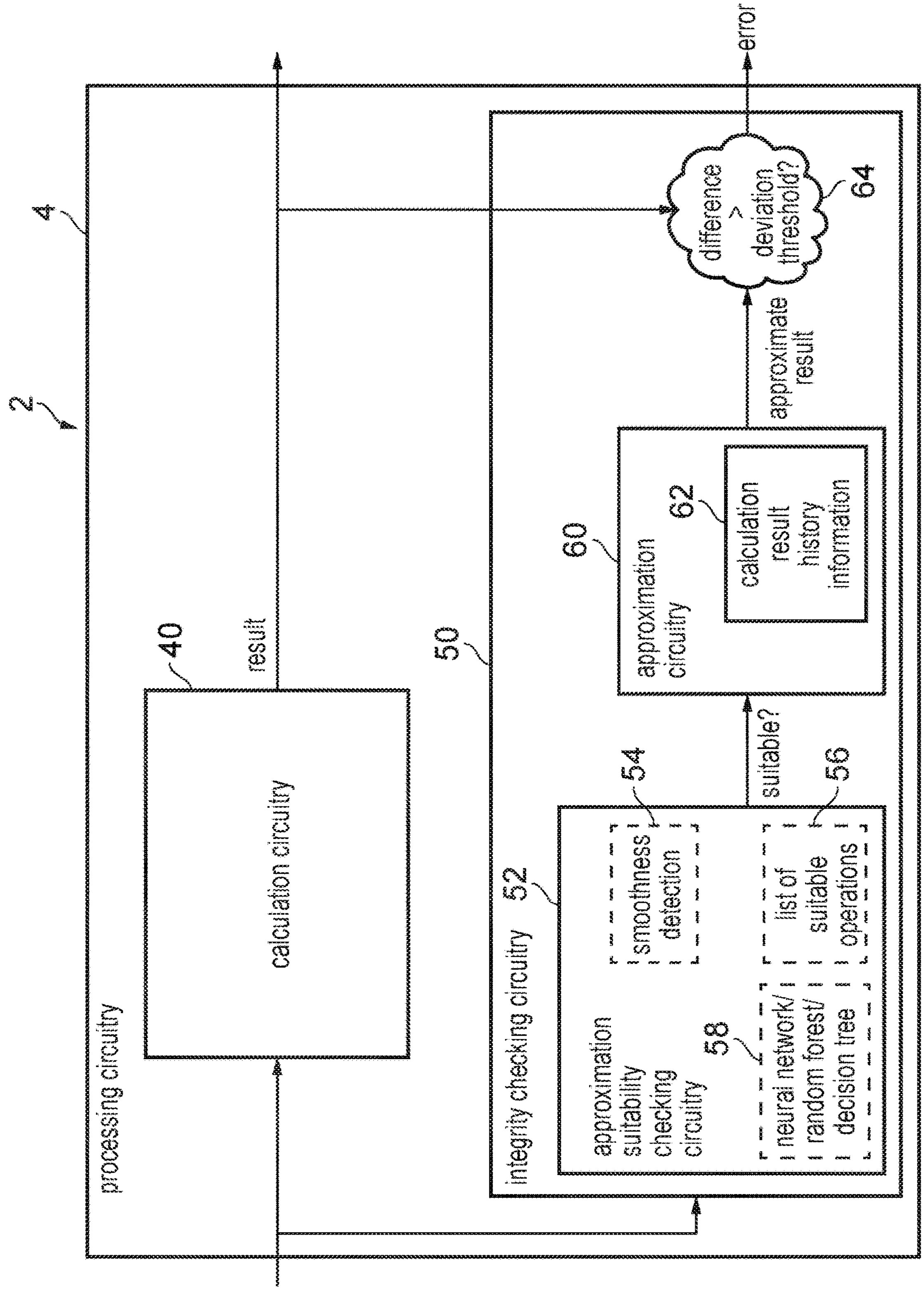
FIG. 2 schematically illustrates processing circuitry provided with integrity checking circuitry.

FIG. 2 schematically illustrates processing circuitry 4 provided with integrity checking circuitry 50 to check the results of calculations performed by calculation circuitry 40. The calculation circuitry 40 may for example correspond to the ALU 20 or FPU 22 depicted in FIG. 1, or elements thereof. The calculation circuitry 40 is responsive to instructions executed by the processing circuitry 4 that require a calculation to be carried out to compute the result or results of that calculation. A fault in the processing circuitry 4 could lead to the calculation circuitry 40 providing an incorrect result as a result of the calculation. This sort of error may be difficult to detect since the result may otherwise appear to be valid with the only indication of the error being that the result is incorrect.

As such, the integrity checking circuitry 50 is provided to check the results produced by the calculation circuitry 40. Rather than having the calculation circuitry 40 repeat the calculation to check the correctness of the calculation just performed or providing replicated circuitry able to carry out a parallel calculation of the result and comparing the results, the integrity checking circuitry 50 is provided with approximation circuitry 60 arranged to calculate an approximate result of the calculation against which the result computed by the calculation circuitry 40 can be compared as shown in comparison 64. Since the approximation circuitry 60 is not expected to produce a precise result for the calculation, when comparing 64 the approximate result and the result from the calculation circuitry 40, a deviation threshold is used such that if a difference between the result from the calculation circuitry 40 and the approximation exceeds the deviation threshold, an error is indicated, which may be indicative of a fault that has been detected in the processing circuitry 4.

The difference may be considered to exceed the deviation threshold if the difference is greater than a particular value or may be considered to exceed the deviation threshold if the difference is greater than or equal to a particular value.

Although various mechanisms may be provided for calculating the approximate result, as shown in FIG. 2, the approximation circuitry 60 maintains calculation result history information 62 based on previous results calculated by the calculation circuitry 40. This calculation result history information 62 can then be used by the approximation circuitry 60 to calculate the approximate result. For example, based on a previous result of a calculation involving a similar operation with similar operands, the approximation circuitry 60 may determine the approximate result on the basis that the approximate result will be similar to the previous result. The calculation result history information 62, may also include, or be used to calculate gradient information indicative of how the operation to be evaluated to perform the calculation varies in dependence on the inputs to the operation. Based on this gradient information, the approximation circuitry 60 can account for the difference between the operands used in a previous calculation and the operands for which an approximate result is to be carried out.

The approximation circuitry 60 is arranged to update the calculation result history information 62 based on the results of calculation circuitry 40. In some cases, the integrity checking circuitry 50 is not invoked to carry out an integrity check on every calculation performed by the calculation circuitry 40. In this case, the approximation circuitry 60 may nonetheless update the calculation result history information 62 when a calculation is performed, even if no integrity check was performed. However, to avoid populating the calculation result history information 62 with result information for which no integrity check was carried out, in some examples, the approximation circuitry 60 is configured to only update the calculation result history information 62 in cases where the integrity check was invoked.

Since the calculation result history information 62 is populated from the results of the calculation circuitry 40 in the example of FIG. 2, the approximation circuitry 60 is trained during the use of the apparatus 2 such that a "warm-up" period may be experienced during which the calculation result history information 62 is populated and during which the accuracy of the approximations made by the approximation circuitry 60 increases.

In some cases, the approximation circuitry 60 may not be suitable for approximating all of the calculations that can be performed by the calculation circuitry 40. As such, approximation suitability checking circuitry 52 is provided to determine for which calculations the approximation circuitry 60 will be able to provide a reliable approximation of the result.

If the integrity checking circuitry 50 is invoked for a calculation that the approximation suitability checking circuitry 52 determines is not suitable for approximation, the approximation suitability checking circuitry 52 may suppress the integrity check operation for that calculation. On the other hand, if the approximation suitability checking circuitry 52 determines that the calculation can be approximated by the approximation circuitry 60, the approximation suitability checking circuitry 52 allows the integrity check operation to proceed.

The determination as to whether a particular calculation can be accurately approximated could be performed in a number of ways. For example, the approximation suitability checking circuitry 52 could operate based on smoothness detection 54 and may be configured to determine whether the calculation involves evaluating a function that is mathematically smooth at the point at which the function is to be evaluated. The smoothness of the function may enable a gradient to be calculated and as such the dependence of the result of the calculation on variation in the inputs. Hence, where the calculation involves evaluating a smooth function, the approximation circuitry 60 may be able to determine the approximate result using a nearby result from the calculation result history information 62 and gradient information.

In some examples however, the approximation suitability checking circuitry 52 makes use of a list of suitable operations 56 such that if the calculation consists of suitable operations for approximating, the approximation suitability checking circuitry 52 will allow the result to be approximated by the approximation circuitry 60. In some examples, the approximation suitability checking circuitry 52 makes use of a neural network, a random forest, or a decision tree 58. These structures may be trained in situ using data observed from the operation of the processing circuitry 4, or may be provided already trained such that the neural network/random forest/decision tree is already able to classify calculations to be performed as suitable for approximation or otherwise.

Figures 3, 4, 5:
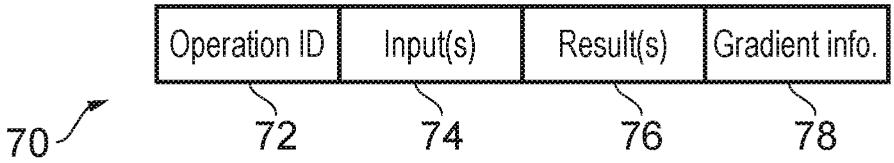
FIG. 3 shows an example entry of calculation result history information.
FIG. 4 shows an example of program code adapted to invoke an integrity check.
FIG. 5 shows another example of program code adapted to invoke the integrity check.

FIG. 3 shows an example entry 70 of calculation result history information. The entry 70 represents a single previous calculation performed by the calculation circuitry 40 and may be used by the approximation circuitry 60 in computing an approximate result of a further calculation. The entry 70 includes an operation identifier (ID) 72 to identify a particular operation form of operation for which the entry 70 represents a result. The entry 70 also comprises an indication of the input or inputs 74 that were used as operands in the operation represented by the entry 70. The entry 76 then indicates the result or results 76 produced by the calculation and gradient information 78 indicative of how the result of the operation varies in dependence on the inputs. This gradient information 78 may be calculated for example based on a difference in the input(s) and result(s) for two previous calculations performed using that operation.

FIG. 4 shows an example of program code adapted to invoke an integrity check. FIG. 4 illustrates a function to evaluate a power. On the left of FIG. 4 is shown the function signature and the right side of FIG. 4 represents the instructions that will be executed by the processing circuitry to carry out the function.

As shown in FIG. 4, the function begins with an integrity checking initiation instruction, the START_IC instruction. The START_IC instruction indicates to the processing circuitry 4 that the integrity check operation is to be carried out in respect of a calculation performed by the following instructions. The START_IC instruction may also indicate an identifier (ID) of a particular element of integrity checking circuitry 50 arranged to carry out integrity checks for the elements of calculation circuitry 40 that is handling the calculation. The START_IC instruction also identifies the number of arguments of the calculation to be subject to integrity checking. In this case, there are two arguments, x and y.

The integrity checking circuitry 40 may be arranged to obtain the arguments from predetermined registers (e.g., from the first two general purpose registers in the register file 14) or the START_IC instruction may in some examples indicate the location of the arguments.

Once the START_IC instruction has been used to indicate the start of the calculation to be subject to integrity checking, the following instructions (not shown) are used to cause the processing circuitry 4 and specifically the calculation circuitry 40 to perform the calculation. To indicate to the integrity checking circuitry 50 that the calculation to be subject to the integrity check operation is complete, an integrity checking termination instruction, the END_IC instruction is provided. Responsive to the integrity checking termination instruction, the integrity checking circuitry 50 is configured to perform the comparison 64 between the result from the calculation circuitry 40 and the approximate result.

Thus, the programmer or the compiler can indicate that an integrity check is to be carried out for a particular calculation and the extent of the instructions representing the calculation.

FIG. 5 shows another example of program code adapted to invoke the integrity check. In the example of FIG. 5, the calculation to divide a by b, as set out on the left side of FIG. 5, has two results—a quotient and a remainder. In this example therefore, the instructions to calculate the quotient are subject to a separate integrity check operation to the instructions used to calculate the reminder. This can be seen in the right side of FIG. 5 which shows a first integrity checking initiation instruction with a first identifier id1 and a first integrity checking termination instruction placed around the instructions for calculating the quotient followed by a second integrity checking initiation instruction with a second identifier id2 and a second integrity checking termination instruction placed around the instructions for calculating the remainder. In this way, the calculation of both results is subject to the integrity check operation to detect any faults leading to errors during the calculation of either of the results.

Figure 6:
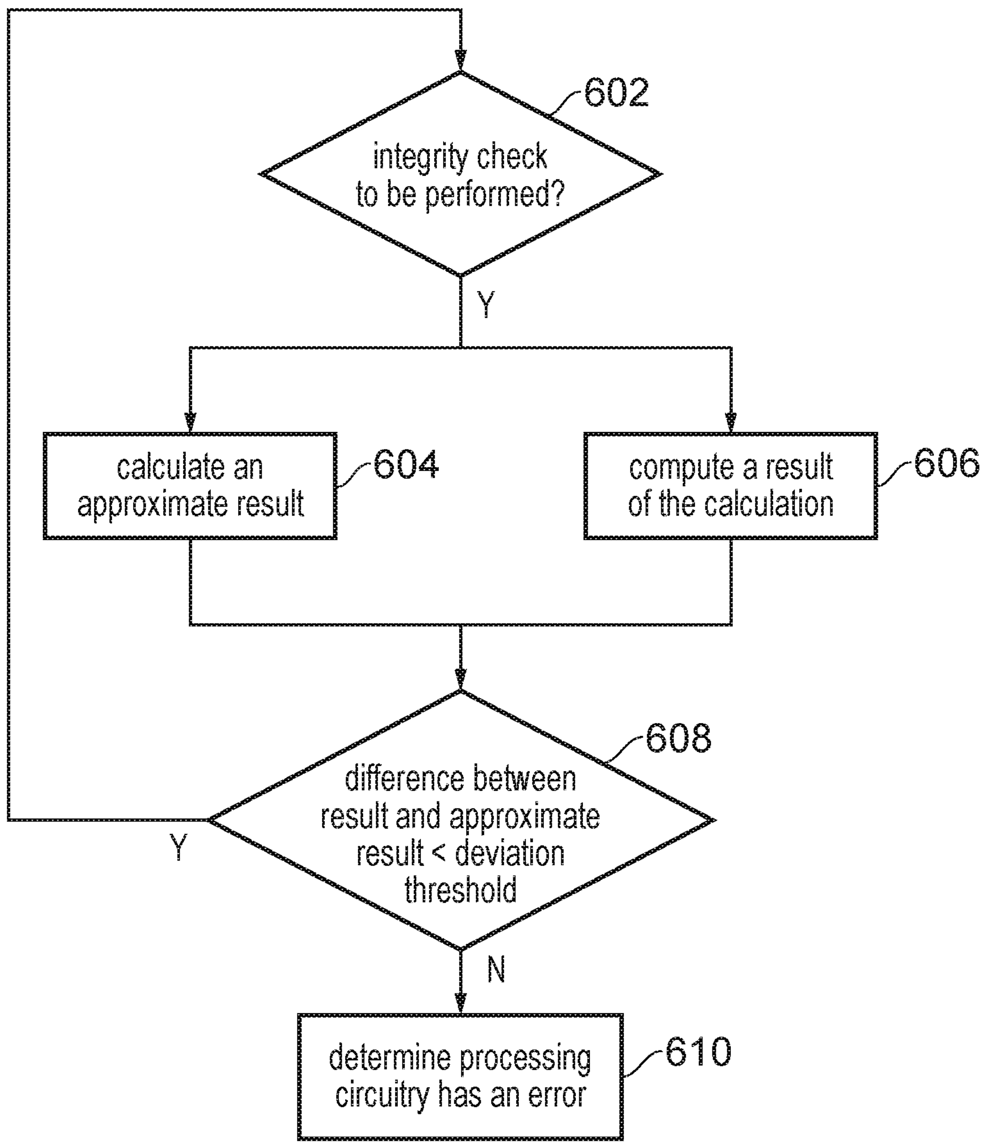
FIG. 6 is a flowchart showing the operation of the integrity check.

FIG. 6 is a flowchart showing the operation of the integrity check. As illustrated in FIG. 6, at step 602 it is determined whether an integrity check is to be performed. This determination may be done on the basis of whether an integrity checking initiation instruction has been received which would indicate that an integrity check is to be performed. Additionally, at step 602, the determination as to whether the calculation to be performed is suitable for approximating may be made. As such, if the calculation is not suitable for approximation, the integrity check will not be performed for that calculation.

If the integrity check is to be performed, the calculation circuitry 40 proceeds with calculating the result at step 606. The approximation circuitry 60 also calculates an approximate result at 604. These results are then compared at step 608 where it is determined whether the difference between the result and the approximate result exceeds a deviation threshold. If the difference does not exceed the threshold, the calculation is deemed to have passed the integrity check. At this point, the result of the calculation may be used to populate the calculation result history information 62.

If on the other hand, the difference between the result and the approximate result does exceed the deviation threshold, the integrity checking circuity 50 determines at step 610 that an error has occurred.

The error may be indicated by writing a value to a register in the register file 14 or by raising an exception for example. The error may be indicative of a fault in the processing circuitry 4 and so may be used as the basis of a decision to replace the processing circuitry 4 or otherwise compensate for the fault. However, since the determination of the error was made on the basis of an approximation, the determination of a single error may not be sufficient to conclusively establish that a fault exists and the presence of a fault may instead be established only in the case of repeated errors detected by the integrity checking circuitry 50.

Figure 7:
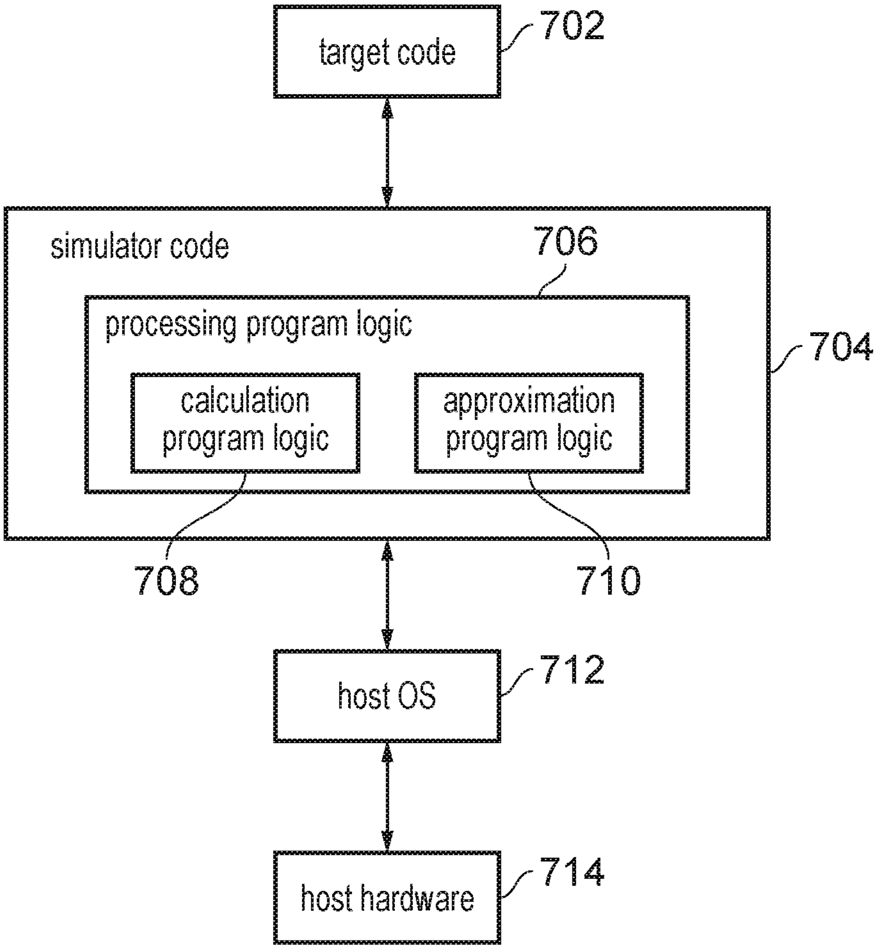
FIG. 7 illustrates a simulator implementation to which the present techniques may be applied.

FIG. 7 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 714, optionally running a host operating system 712, supporting the simulator program 704. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 714), some simulated embodiments may make use of the host hardware, where suitable.

The simulator program 704 may be stored on a computer-readable storage medium (which may be a non-transitory medium), and provides a program interface (instruction execution environment) to the target code 702 (which may include applications, operating systems and a hypervisor) which is the same as the interface of the hardware architecture being modelled by the simulator program 704. Specifically, the simulator program 704 contains simulator code to provide processing program logic 706, calculation program logic 708, and approximation program logic 710 corresponding to the processing circuitry 4, calculation circuitry 40, and approximation circuitry 60 respectively. Thus, the program instructions of the target code 702, including the integrity checking initiation instruction and the integrity checking termination instruction described above, may be executed from within the instruction execution environment using the simulator program 704, so that a host computer 714 which does not actually have the hardware features of the apparatus 2 discussed above can emulate these features.

Thus, there has been described a mechanism for quickly and efficiently checking the results of a calculation performed by the processing circuitry 4 that avoids the need for the entire calculation logic to be replicated or the calculation to be performed more than once. The integrity checking operation can also be selectively employed with instructions provided to indicate to the processing circuitry 4 whether the integrity checking operation is to be carried out.

The invention claimed is:

1. An apparatus comprising:

processing circuitry configured to execute instructions;

wherein the processing circuitry comprises:

calculation circuitry responsive to one or more instructions requiring a calculation to be performed to compute the result of the calculation;

approximation circuitry responsive to said one or more instructions to calculate an approximate result of the calculation independently of the calculation circuitry; and integrity checking circuitry configured to perform an integrity check by:

comparing the result of the calculation performed by the calculation circuitry and the approximate result of the calculation performed by the approximation circuitry; and detecting an error in the processing circuitry in response to determining that a difference between the result of the calculation and the approximate result of the calculation is greater than a deviation threshold, wherein the integrity check is performed with respect to a particular calculation in response to a determination as to whether the particular calculation is suitable for approximation by the approximation circuitry.

2. The apparatus according to claim 1, wherein:

the approximation suitability checking circuitry is configured to determine that the particular calculation is suitable for approximation by the approximation circuitry in response to the particular calculation being instructed between execution of an integrity checking instruction and execution of an integrity checking termination instruction.

3. The apparatus according to claim 2, wherein:

the calculation operates on one or more operands;

the integrity checking initiation instruction specifies one or more registers; and the approximation circuitry is configured to obtain the one or more operands from the one or more specified registers.

4. The apparatus according to claim 1, wherein: the calculation operates on one or more operands; and the approximation circuitry is configured to obtain the one or more operands from one or more predetermined registers.

5. The apparatus according to claim 1, wherein:

the approximation circuitry comprises approximation suitability checking circuitry configured to perform the determination as to whether the particular calculation is suitable for approximation by the approximation circuitry and to only allow the integrity check to be performed in respect of the particular calculation responsive to determining that the particular calculation is suitable for approximation by the approximation circuitry.

6. The apparatus according to claim 5, wherein:

the approximation suitability checking circuitry is configured to determine that the particular calculation is suitable for approximation based on determining that the calculation comprises evaluating a function that is mathematically smooth at a point at which the function is to be evaluated.

7. The apparatus according to claim 5, wherein:

the approximation suitability checking circuitry is configured to determine whether a particular calculation is suitable for approximation by the approximation circuitry using at least one of a neural network, a random forest, and a decision tree.

8. The apparatus according to claim 5, wherein:

the approximation suitability checking circuitry is configured to identify the calculation as suitable for approximation by the approximation circuitry responsive to determining that the calculation corresponds to an operation from a predetermined list of operations.

9. The apparatus according to claim 1, wherein the approximation circuitry is configured to:

maintain calculation result history information based on previous results of calculations computed by the calculation circuitry; and reference the calculation result history information to calculate the approximate result of the calculation.

10. The apparatus according to claim 9, wherein the calculation result history information comprises:

an indication of the previous results of the calculations computed by the calculation circuitry; and gradient information indicative of how an operation to be evaluated to carry out the calculation varies in dependence on the inputs to the operation.

11. The apparatus according to claim 10, wherein:

the approximation circuitry is configured to calculate the approximate result of the calculation based on a corresponding previous result of the previous results and the gradient information from the calculation result history information.

12. The apparatus according to claim 9, wherein:

the approximation circuitry is responsive to the calculation circuitry computing the result of a given calculation to update the calculation result history information based on the result of the given calculation.

13. The apparatus according to claim 12, wherein updating the calculation result history comprises:

storing the result of the given calculation;

calculating new gradient information based on the result of the given calculation and the previous result; and storing the new gradient information.

14. The apparatus according to claim 1, wherein:

the calculation circuitry is an arithmetic logic unit (ALU) or part of an ALU.

15. The apparatus according to claim 1, wherein:

the calculation circuitry is a floating point unit (FPU) or part of an FPU.

16. The apparatus according to claim 1, wherein:

the integrity checking circuitry is configured to obtain the deviation threshold from a system register.

17. The apparatus according to claim 1, wherein:

the approximation circuitry is configured to determine a level of confidence association with the approximation; and the deviation threshold is based on the level of confidence.

18. The apparatus according to claim 2, wherein:

the processing circuitry is responsive to execution of at least one of the integrity checking initiation instruction and the integrity checking termination instruction specifying a particular deviation threshold to cause the integrity checking circuitry to use the particular deviation threshold as the deviation threshold.

19. A method comprising:

executing instructions by processing circuitry;

computing, responsive to one or more instructions requiring a calculation to be performed, the result of the calculation;

calculating, responsive to said one or more instructions, an approximate result of the calculation independently of the computing; and perform an integrity check by:

comparing the result of the calculation and the approximate result of the calculation from; and detecting an error in the processing circuitry in response to determining that a difference between the result of the calculation and the approximate result of the calculation is greater than a deviation threshold, wherein the integrity check is performed with respect to a particular calculation in response to a determination as to whether the particular calculation is suitable for approximation by the approximation circuitry.

20. A non-transient storage medium comprising a computer program for controlling a host data processing apparatus to provide an instruction execution environment comprising:

processing program logic to execute instructions;

wherein the processing program logic comprises:

calculation program logic responsive to one or more instructions requiring a calculation to be performed to compute the result of the calculation;

approximation program logic responsive to said one or more instructions to calculate an approximate result of the calculation independently of the calculation program logic; and integrity checking program logic configured to perform an integrity check by:

comparing the result of the calculation performed by the calculation program logic and the approximate result of the calculation performed by the approximation program logic; and detecting an error in the processing program logic in response to determining that a difference between the result of the calculation and the approximate result of the calculation is greater than a deviation threshold, wherein the integrity check is performed with respect to a particular calculation in response to a determination as to whether the particular calculation is suitable for approximation.

* * * * *